United States Patent [19]

Hurlburt

[11] Patent Number: 5,322,309
[45] Date of Patent: Jun. 21, 1994

[54] OSCILLATION STOPS FOR TRACTORS WITH COMPOUND STEERING MECHANISM

[75] Inventor: Joseph C. Hurlburt, Lancaster, Pa.

[73] Assignee: Ford New Holland, Inc., New Holland, Pa.

[21] Appl. No.: 974,450

[22] Filed: Nov. 12, 1992

[51] Int. Cl.$^5$ .............................................. B62D 1/00
[52] U.S. Cl. .................................. 280/109; 280/97; 180/156; 180/266
[58] Field of Search .............. 280/95.1, 97, 98, 85, 280/89, 109, 113, 117, 112.2; 180/79.4, 144, 155, 156, 266, 267

[56] References Cited

U.S. PATENT DOCUMENTS

| 3,149,855 | 9/1964 | Adloff et al. | 267/52 |
| 3,370,670 | 2/1968 | Love | 180/79.2 |
| 5,046,577 | 9/1991 | Hurlburt | 280/97 |

FOREIGN PATENT DOCUMENTS 1630721 8/1967 Fed. Rep. of Germany .
89/07545 8/1989 PCT Int'l Appl. .

Primary Examiner—Margaret A. Focarino
Assistant Examiner—Paul Dickson
Attorney, Agent, or Firm—Larry W. Miller; Frank A. Seemar

[57] ABSTRACT

A tractor having a steerable axle that pivotally moves laterally in response to a corresponding steering action of the steerable wheels mounted on the steerable axle and is also pivotally supported for oscillatory pitching movement about a longitudinal axis is disclosed wherein an oscillation stop is provided in the form of an arcuate track mounted to the steerable axle and a pair of transversely spaced rollers engageable with the arcuate track through the entire range of lateral movement of the axle to limit the amount of permissible oscillatory pitching movement. The arcuate track has a center of curvature that coincides with the vertical pivot axis for the lateral movement of the axle. The rollers are spaced on opposing sides of the longitudinal axis and have rotational axes that are generally aligned with the center of curvature of the arcuate track.

14 Claims, 5 Drawing Sheets

OSCILLATION STOPS FOR TRACTORS WITH COMPOUND STEERING MECHANISM

BACKGROUND OF THE INVENTION

This invention relates generally to a steering mechanism for an agricultural tractor in which the front axle is laterally shiftable in response to a steering movement of the steerable wheels and, more particularly, to an oscillation stop mechanism that is cooperable with the laterally shiftable axle to limit the amount of oscillatory pitching movement throughout the entire range of lateral shifting movement of the axle.

Tractors, whether used in an agricultural setting or in an industrial setting, typically include a fixed axle through which primary driving power is transferred through fixed wheels rotatably mounted on opposing ends of the fixed axle, and a steering axle having pivotally mounted steerable ground engaging wheels rotatably mounted on the opposing ends thereof to support the chassis of the tractor above the ground. Supplemental driving power is often provided through the steerable ground engaging wheels, while a steering mechanism remotely controllable by the operator from the operator's compartment selectively controls the pivotal movement of the steerable wheels relative to the steering axle.

One such steering mechanism incorporates a transversely disposed, horizontally extending hydraulic cylinder supported by the steering axle and connected to the opposing steerable wheels. This hydraulic cylinder affects pivotal movement of the steerable wheels about their respective pivotal connections to the steering axle by manipulating the pressures in the hydraulic cylinder to effect a transverse displacement of cylinder rod, causing a turning of the wheels.

Due to physical limitations relating to the range of movement of the steering mechanism and to the eventual interference between the steerable wheels and the steering axle or chassis frame, the amount of pivotal movement of the steerable wheels relative to the steering axle is limited by tire size and track setting to a given restricted turning angle. This maximum turning angle defines the minimum turning radius of the tractor for a given chassis clearance width, axle oscillation angle, wheel base length and king pin spacing. The selection of the length of the wheel base, i.e., the distance between the fixed axle and the steering axle, is a compromise between the need to minimize the turning radius and, therefore, minimize the wheel base length, and to maximize ride considerations which require longer wheel base lengths.

Further complicating the development of a steerable axle to improve turning characteristics of vehicles such as agricultural tractors is the requirement of accommodating the oscillatory pitching movement associated with such vehicle axles. The limits imposed on the structural components to stop the pitching motion of the axle relative to the chassis must be effective throughout the entire range of lateral shifting movement provided to the steerable axle.

SUMMARY OF THE INVENTION

It is an object of this invention to overcome the aforementioned disadvantages of the prior art by providing an oscillation stop operative disposed between a steerable axle and the chassis on which the steerable axle is pivotally supported to be effective throughout the entire range of laterally shifting movement provided to the axle.

It is a feature of this invention that the oscillation stop includes an arcuate track and a pair of transversely spaced rollers engageable with the track throughout the entire range of lateral movement of the steerable axle.

It is an advantage of this invention that the arcuate track and engageable rollers limit the amount of oscillatory pitching movement allowed to the axle irrespective of the laterally shifted position of the axle relative to the chassis.

It is another feature of this invention that the arcuate track has a center of curvature that generally coincides with the pivot joint for the lateral shifting movement of the steerable axle.

It is still another feature of this invention that the rollers are positioned on opposing sides of the longitudinally extending axis about which the steerable axis oscillates.

It is yet another feature of this invention that the rollers are rotatable about axes of rotation that are essentially aligned with the pivot joint about which the steerable axle pivots for lateral shifting movement.

It is another advantage of this invention that the rollers and arcuate track maintain alignment irrespective of the laterally shifted position of the steerable axle.

It is still another advantage of this invention that the chassis will move vertically in concert with the axle after the permissible amount of pitching movement has been encountered.

It is another object of this invention to provide a steerable axle capable of lateral shifting movement and of controlled oscillatory pitching movement, either independently or simultaneously.

It is still another object of this invention t provide an oscillation stop for a laterally shiftable steerable axle to limit the pitching motion of the steerable axle, which is durable in construction, inexpensive of manufacture, carefree of maintenance, facile in assemblage, and simple and effective in use.

These and other objects, features, and advantages are accomplished according to the instant invention by providing a tractor having a steerable axle that pivotally moves laterally in response to a corresponding steering action of the steerable wheels mounted on the steerable axle and is also pivotally supported for oscillatory pitching movement about a longitudinal axis wherein an oscillation stop is provided in the form of an arcuate track mounted to the steerable axle and a pair of transversely spaced rollers engageable with the arcuate track through the entire range of lateral movement of the axle to limit the amount of permissible oscillatory pitching movement. The arcuate track has a center of curvature that coincides with the vertical pivot axis for the lateral movement of the axle. The rollers are spaced on opposing sides of the longitudinal axis and have rotational axes that are generally aligned with the center of curvature of the arcuate track.

BRIEF DESCRIPTION OF THE DRAWINGS

The advantages of this invention will become apparent upon consideration of the following detailed disclosure of the invention, especially when taken into conjunction with the accompanying drawings wherein.

DETAILED DESCRIPTION OF THE PREFERRED EMBODIMENT

Figure 1:
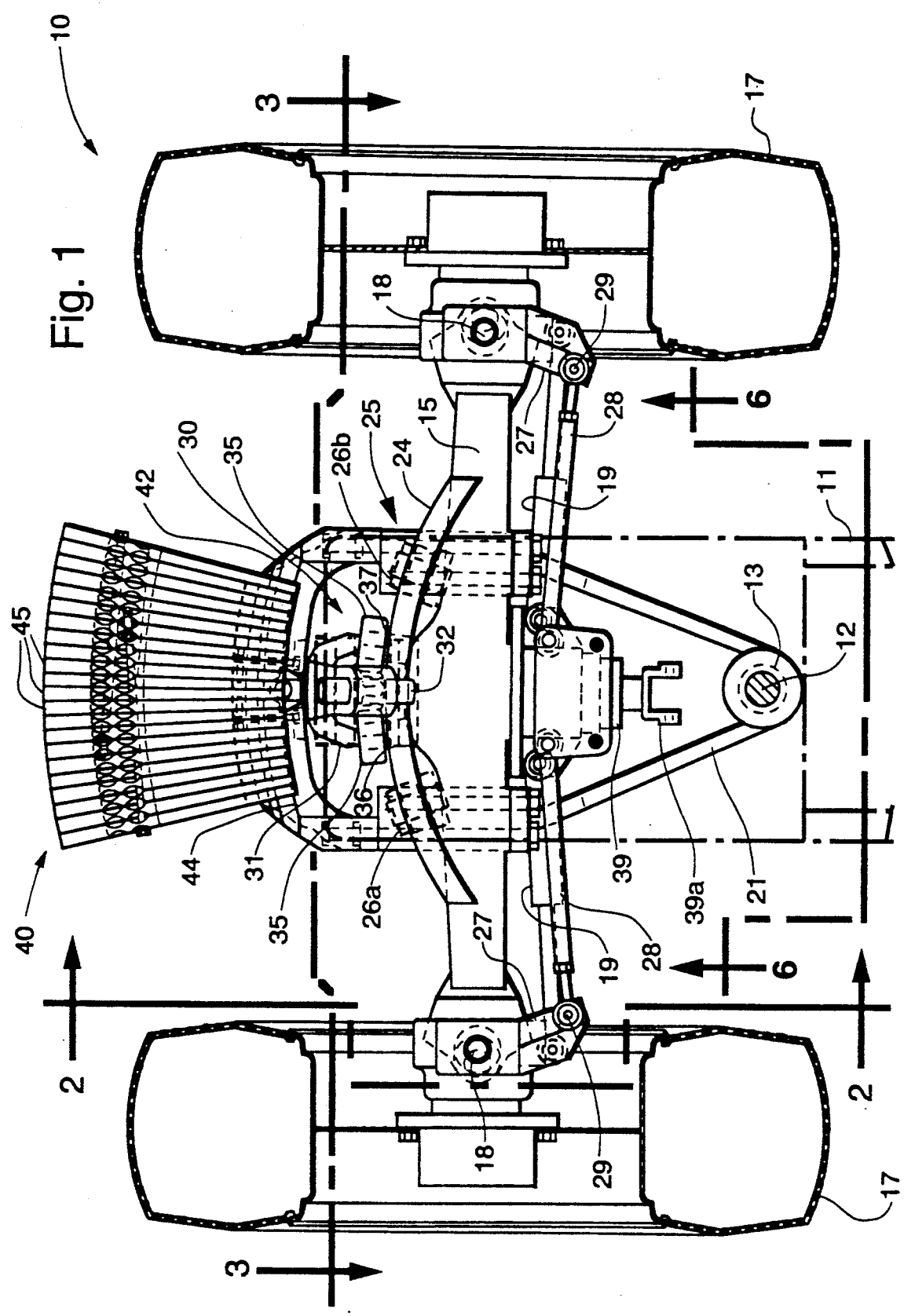
FIG. 1 is a top plan view of a front axle assembly for an agricultural tractor incorporating the principles of the instant invention, the front portion of the tractor chassis overlying the front axle assembly being shown in phantom.
Figure 2:
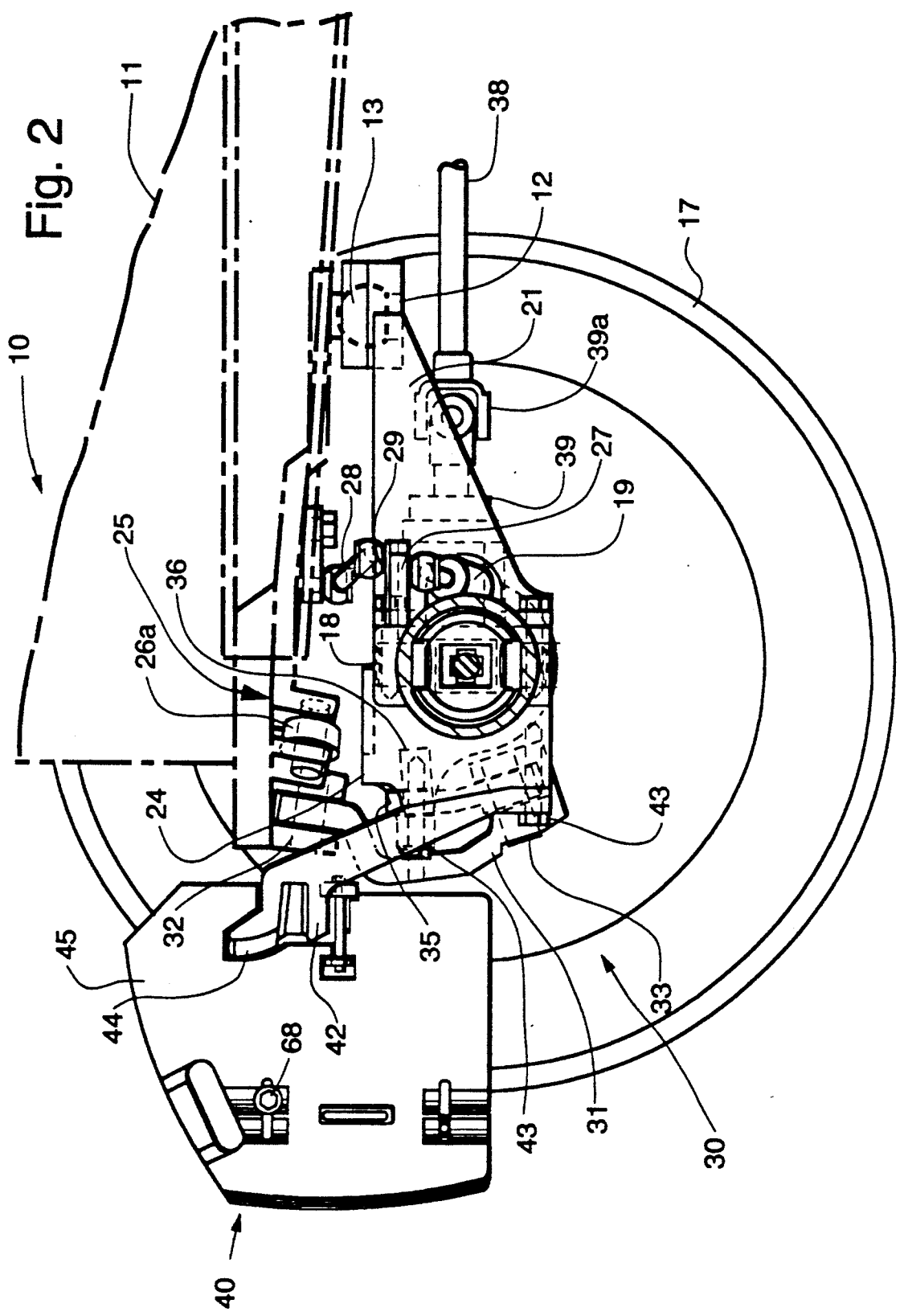
FIG. 2 is a cross-sectional view of the front axle assembly taken along lines 2—2 of FIG. 1, the front portion of the tractor chassis being shown in phantom relative to the front axle assembly.
Figure 3:
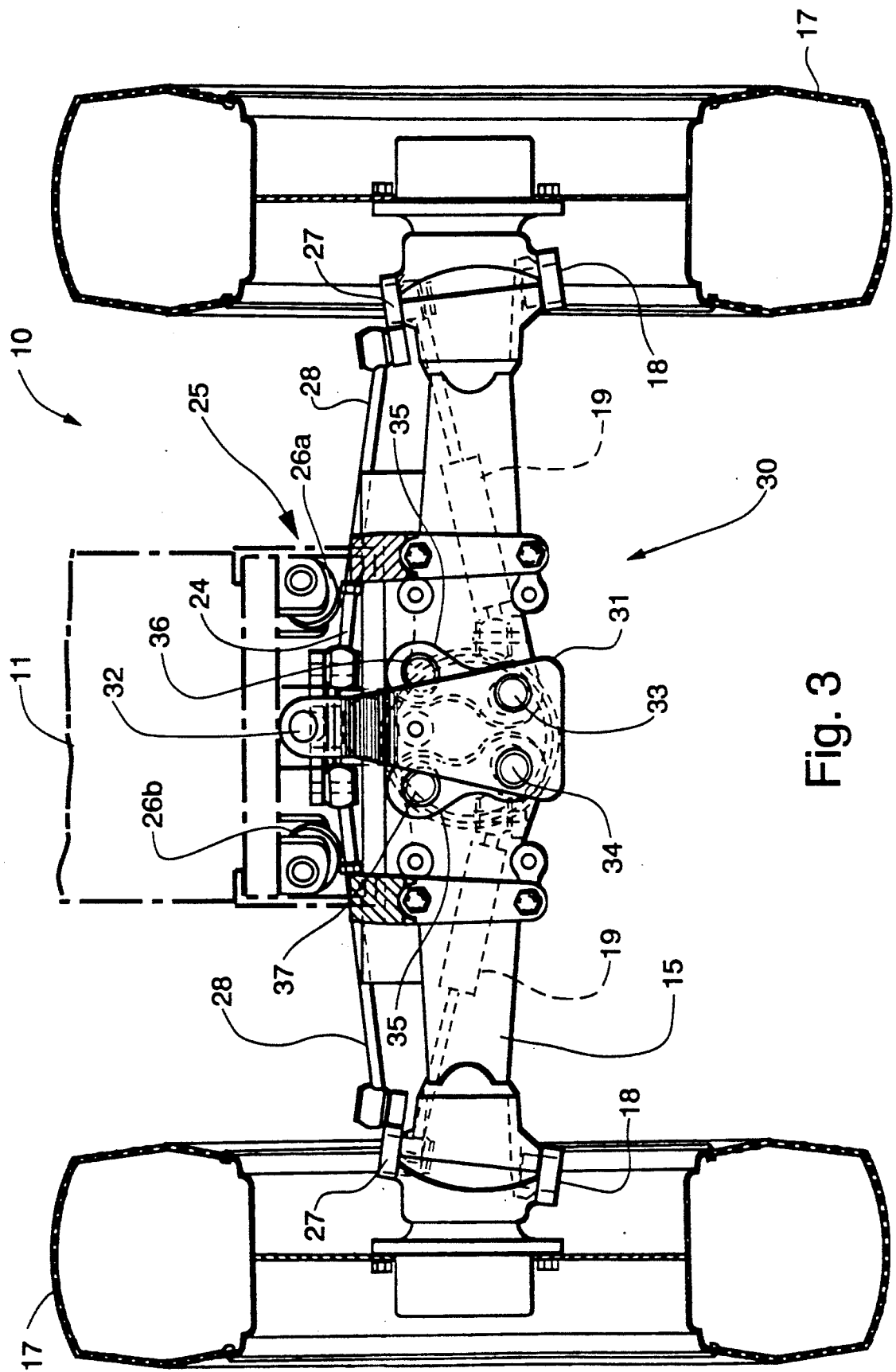
FIG. 3 is a cross-sectional view of the tractor front axle assembly taken along lines 3—3 of FIG. 1 to depict generally a front elevational view of the tractor assembly immediately rearwardly of the weights.

Referring now to FIGS. 1-3, a laterally shifting front axle assembly for an agricultural tractor or other vehicle, pivotally connected to the vehicle chassis to provide a decreased turning radius for an given wheel base, can best be seen. The front axle assembly 10 is pivotally connected to the tractor chassis 11 for pivotal movement about a generally vertical axis 12, thereby allowing the front axle assembly 10 to rotate about the pivot axis 12 and shift the front axle assembly 10 laterally relative to tractor chassis 11. The pivot axis 12 includes a spherical ball joint 13 to permit some oscillatory movement of the front axle 15 relative to the chassis 11. The details of a laterally shiftable front axle assembly to provide better turning capabilities is described in detail in U.S. Pat. No. 5,046,577 issued on Sep. 10, 1991 to Joseph C. Hurlburt, the description of which is incorporated herein by reference.

The front axle assembly 10 includes a transversely extending axle member 15 having pivotally mounted on the respective laterally opposing ends thereof a pair of steerable wheels 17 pivotable about respective nearly vertical king pin axes 18 to effect a steering of the wheels 17 relative to the axle member 15. A pair of hydraulic cylinders 19 interconnect the axle member 15 and the steerable wheels 17 via a steering arm 27 to control the pivotable movement of the wheels 17 relative to the axle member, and thereby, effect steering.

The front axle member 15 carries a rearwardly extending subframe member 21 which carries the vertical pivot 12 and ball joint 13 connected to the tractor chassis 11 rearwardly of the front axle member 15 yet generally positioned laterally between the front steerable wheels 17. A front yoke assembly 30 suspends the laterally shiftable front axle member 15 from the forward end of the tractor chassis 11 to permit a pivotal movement of the front axle assembly 10 relative to tractor chassis 11 about the vertical axis 12. To facilitate relative movement between the front axle assembly 10 and the tractor chassis 11 when the axle is fully oscillated, the front axle member 15 is also provided with an arcuate track 24 having a center of curvature essentially coincident with the pivot axis 12.

The chassis 11 carries a pair of laterally spaced rollers 26a, 26b that are engageable with the arcuate track 24 when the front axle member 15 oscillates generally about a horizontal axis in response to changing ground contours and undulations to form an oscillation stop 25 when one of the rollers 26a, 26b engage the arcuate track 24 to provide a limit to the vertical movement or oscillatory pitching movement of the front axle member 15 relative to the tractor chassis 11. The rollers 26a, 26b are rotatably supported about respective axes of rotation carried by the chassis 11 and intersect at a point slightly forwardly of the pivot axis 12, which is generally coincidental with the center of curvature of the track 24. As a result, the rollers 26a, 26b follow along the line of the arcuate track 24 throughout the entire range of lateral movement of the axle 15 relative to the chassis 11.

Whenever the axle 15 oscillates vertically relative to the chassis 11, the resultant tilting of the generally vertical line defining the center of curvature of the track 24 intersects with the line of the axis of rotation of the roller 26a, 26b that would be engaging the track 24 to halt the vertical movement of the axle 15 relative to the chassis 11. It has been found that this configuration facilitates the continued steering movement of the axle 15 relative to the chassis whenever the roller 26a or 26b has engaged the track 24. Preferably, the arcuate track 24 is formed as part of the axle 15 and the rollers 26a, 26b are mounted on the chassis 11; however, one skilled in the art will readily realize that this configuration could be reversed.

A pair of tie rods 28 interconnecting the chassis 11 and the steerable wheels 17 transmit coordinated steerable movement of the wheels 17 relative to each other and to the front axle member 15 and to a lateral shifting movement of the chassis 11 relative to the front axle 15. Although the front axle 15 is pivotally connected to the chassis 11, the front axle 15 is engaged with the ground through the wheels 17 and the actual pivotal movement results in a lateral shifting of the chassis 11. Looking at the front axle 15 from the reference frame of the chassis 11, the appearance is that the axle 15 shifts relative thereto and any reference hereinafter describing the pivotal movement of the front axle member 15 relative to the chassis is so described.

Because of the fixed length of the tie rods 28 interconnecting the chassis 11 and the wheels 17 at a connection point 29 spaced inwardly toward the center of the chassis 11 and rearwardly from the respective pivot axis or king pin 18 for the corresponding steerable wheel 17 by a rearwardly and inwardly extending steering arm 27, a pivotable movement of the wheel 17 about the corresponding pivot axis 18 will result in a corresponding shifting of the front axle 15 relative to the center (not shown) of a tractor chassis 11, along which the vertical pivot axis 12 is positioned.

Figure 4:
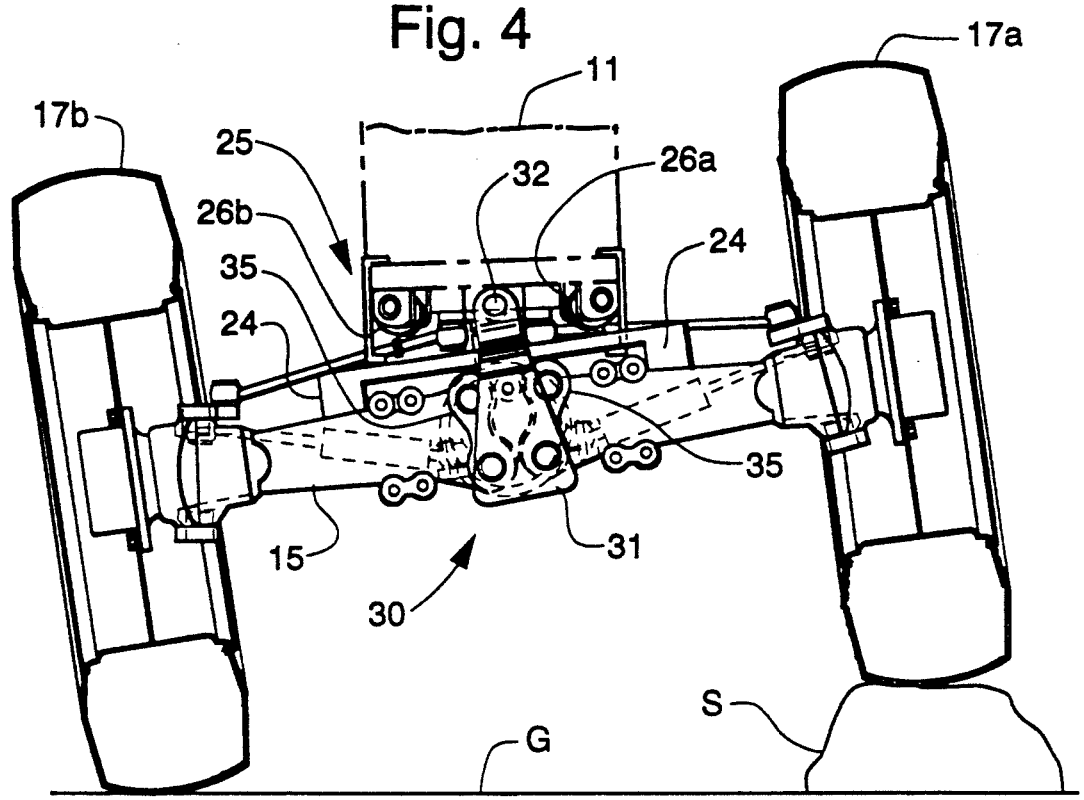
FIG. 4 is a schematic front elevational view of the steerable axle and associated support linkage undergoing a straight oscillatory pitching motion.

The front yoke assembly 30 has a contoured front carrier member 31 pivotally connected at a second pivot joint 32 to the chassis 11. The front carrier member 31 also carries a pair of transversely spaced third and fourth lower pivots 33, 34, respectively, for pivotally supporting a corresponding pair of dog bone-shaped links 35 which, in turn, are pivotally connected to the front axle member 15 by respective transversely spaced fifth and sixth pivots 36, 37. As depicted in FIG. 4, each of the pivots 32, 33, 34, 36 and 37 associated with the front yoke assembly 30 have a corresponding pivot axis aligned with the center of the ball joint 13, which is located on the pivot axis 12. Accordingly, the pivot axis for each of the five pivots 32, 33, 34, 36 and 37 have a nonparallel relationship intersecting a common point at the center of the ball joint 13.

As a result, the pivotal movement of the front axle assembly 10 relative to the tractor chassis 11, resulting in a lateral shifting of the front axle member 15, is accomplished through a four-bar linkage which has very little vertical component associated with the movement thereof, yet the chassis 11 maintains a substantially uniform elevation relative to the front axle 15 throughout the range of relative movement between the front steerable axle and the vehicle chassis. The main pivot axis for lateral shifting and vertical oscillatory movement of the front axle 15 is the axis defined by the second pivot joint 32 extending through the ball joint 13, as both the pivot 32 and the ball joint 13 are fixed relative to the chassis 11. The generally transverse lines defined by the tie rods 28 extend through this main pivot axis extending through pivot 32 and ball joint 13 so that movements of the axle 15, especially oscillatory movements, causes a minimum additional steering effect to the axle 15.

As depicted in FIGS. 1-3, the front axle assembly 10 may be powered in a conventional manner from the transmission (not shown) carried by the tractor chassis 11 through the front wheel drive shaft 38 connected to a conventional front wheel drive mechanism 39 to operatively power the rotation of the steerable wheels 15 to facilitate movement of the tractor chassis 11 over the ground. One skilled in the art will readily realize that the provision of a front wheel drive mechanism 39 is optional and independent of the operation of the compound steering mechanism permitting a lateral shifting of the tractor chassis 11 relative to the front axle member 15. The continuous driving of the front wheels 17 during steering operation involving a lateral shifting of the tractor chassis 11 relative to the front axle member 15 can be accommodated by the universal joint 39a interconnecting the front wheel drive mechanism 39 and the drive shaft 38.

The tractor ballast assembly 40 is carried by the front axle assembly 10 intermediate of the steerable wheels 17 at a position centrally therebetween. A carrier 42 is detachably connected by fasteners 43 to the front axle member 15 to extend forwardly thereof and forwardly of the tractor chassis 11, as well. The carrier 42 is provided with an arcuate mounting ring 44 upon which individual suitcase weights 45 are supported. Since the carrier 42 move with the front axle member 15 relative to the chassis 11, the position of the ballast assembly 40 relative to the laterally spaced front wheels 17 remains relatively fixed, thereby maintaining a substantially constant weight distribution relative to the front wheels 17.

Furthermore, since the ballast assembly 40 moves with the axle member 15, the steering clearance between the pivotally movable wheels 17 and the ballast assembly 40 does not change as the front axle 15 shifts laterally and/or oscillates vertically. As a result, the operator may mount additional weight units 45 to increase the amount of ballast on the front axle 15 without decreasing the tire clearance below that which is acceptable for traditional tractors. Greater detail in the construction and assemblage of the individual weights 45 to form the ballast assembly can be found in U.S. Pat. No. 5,219,180, issued to Randall E. Zipser, et al, on Jun. 1, 1993, the descriptive portions of which are incorporated herein by reference.

Referring to FIGS. 4-7, the operation of the oscillation stop 25 to limit the oscillatory pitching motion of the axle 15 relative to the chassis 11 can best be seen. In FIG. 4, the left steerable wheel 17a is running over an obstacle the ground G. As a result, the left steerable wheel 17a rises relative to the right steerable wheel 17b to cause a pitching motion of the axle 15 relative to the chassis 11. The rollers 26a, 26b, being spaced on opposing sides of the generally horizontal, longitudinal pitching axis extending between the first pivot 13 and the second pivot 32, are positioned such that the left roller 26a will engage the arcuate track 24 to stop the vertical motion of the axle 15. Any further upward movement of the axle 15 beyond what is depicted in FIG. 4 will result in a contacting of the roller 26a with the track 24 and then a corresponding movement of the chassis 11 upwardly with the axle 15.

Figure 5:
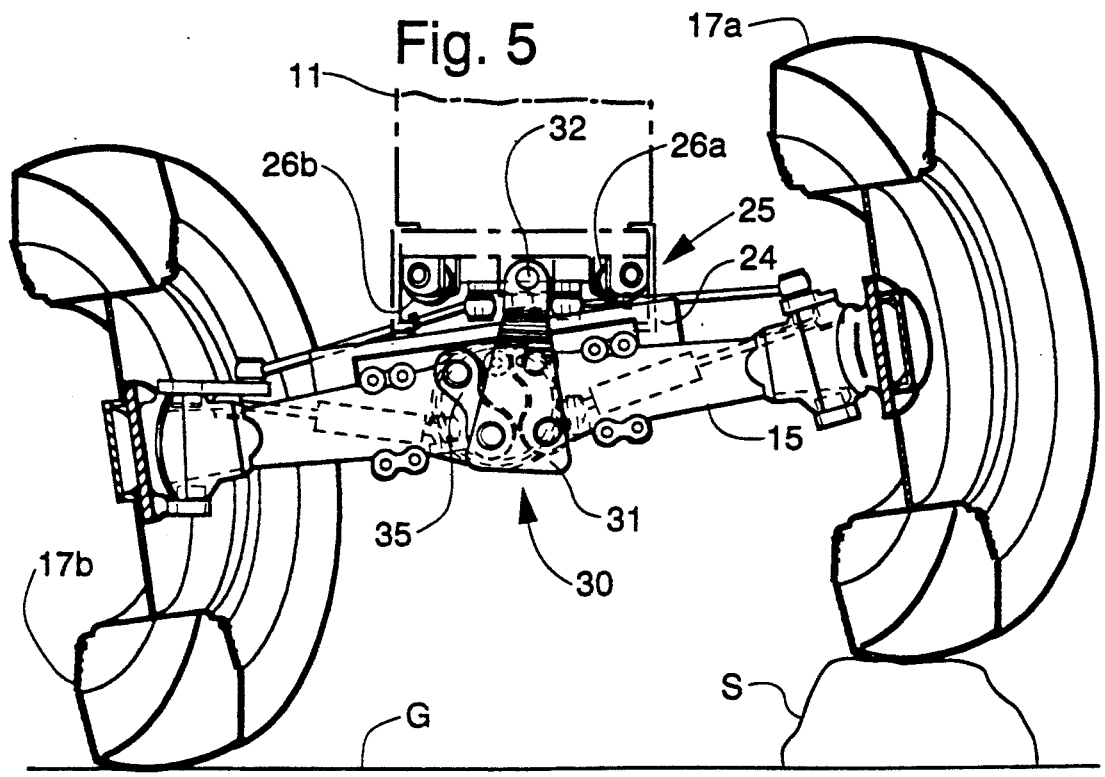
FIG. 5 is a schematic front elevational view similar to that of FIG. 4, except that the steerable axle is making a right turn simultaneously with the oscillatory pitching motion induced by traveling over an obstacle.

Referring to FIG. 5, the orientation of the components of the front yoke assembly 30 can best be seen when the axle 15 is undergoing both a lateral shifting movement and an oscillatory pitching movement. The carrier 31 and link members 35 pivotally move substantially as described above, except that the compounded motion induced by the pitching of the axle 15 results in a lessening of the pivotal movement of the carrier member 31 until the track 24 meets the respective roller 26a to limit the pitching motion. One skilled in the art will readily realize that the oscillatory movement of the axle 15 will result in a corresponding pivotal movement of the carrier 31 with respect to the chassis 11 without causing movement between the carrier 31, link members 35 and axle 15. Using a roller 26 as the oscillation stop allows the axle 15 to move laterally relative to the chassis 11, and thereby continue the steering operation described above, even when the axle 15 is fully moved through the entire range of permitted oscillation.

Figure 6:
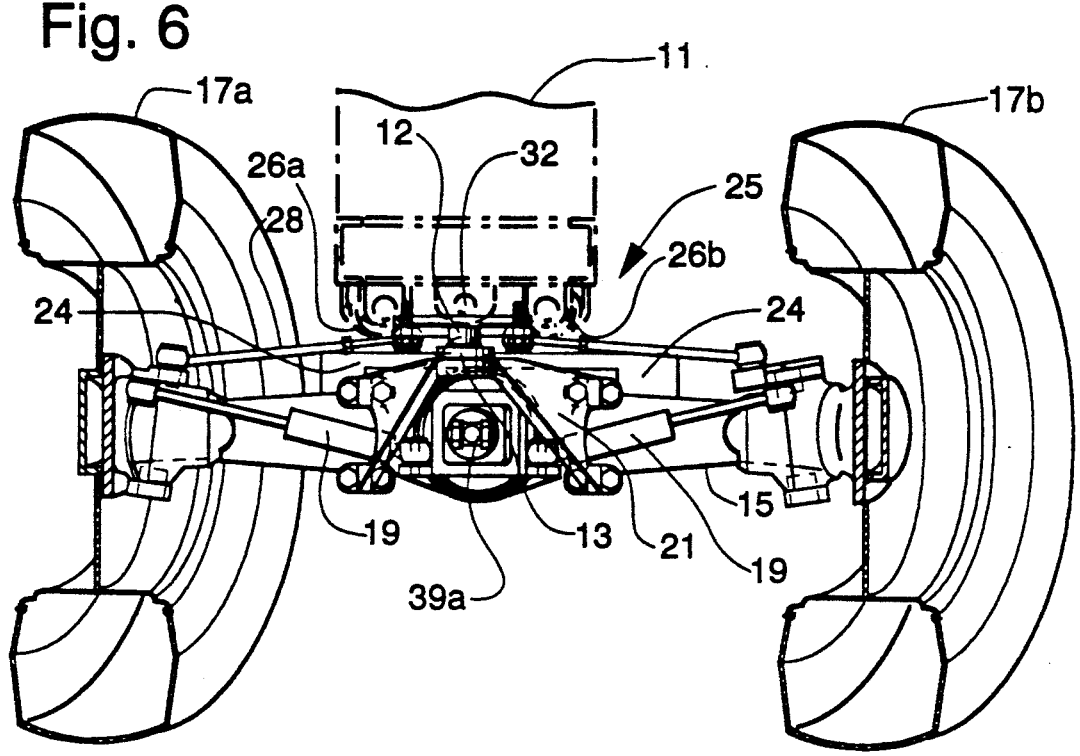
FIG. 6 is a cross-sectional view taken along lines 6—6 of FIG. 1 to depict a rear elevational view of the steerable axle and associated linkage taken immediately behind the vertical pivot axis for the lateral movement of the axle, the chassis being shown in phantom and the axle being shifted with the pivoting of the wheels to negotiate a right turn.
Figure 7:
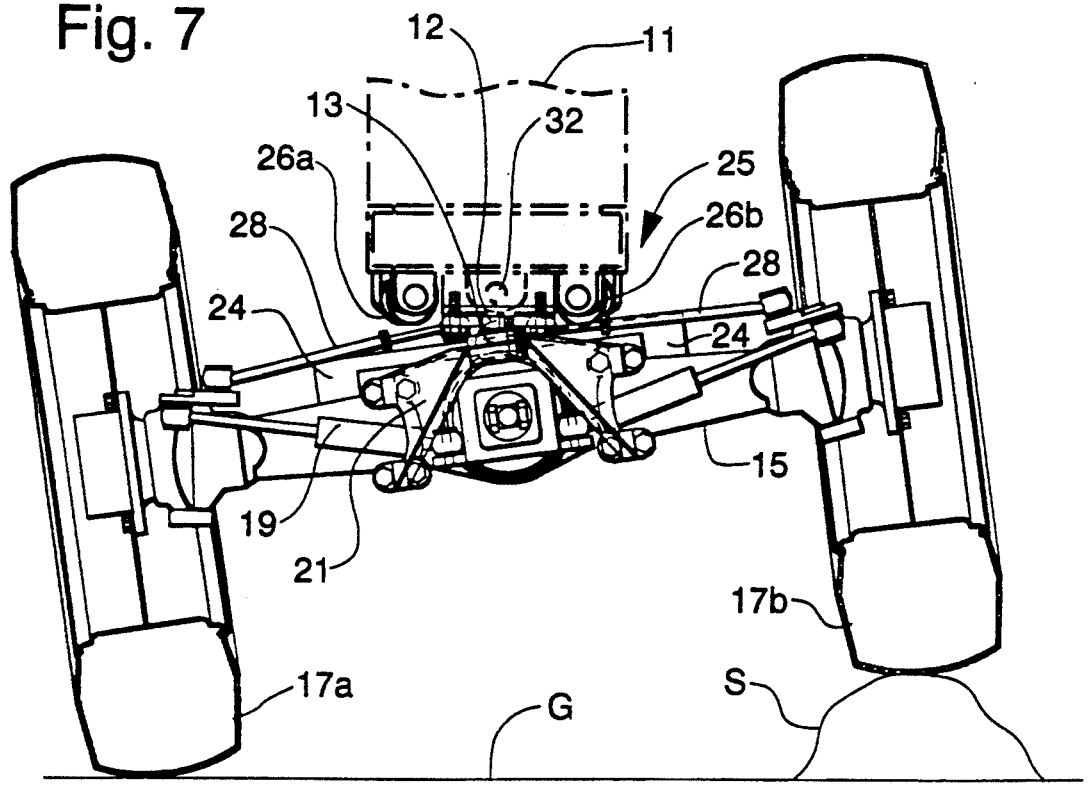
FIG. 7 is a cross-sectional view taken along the same lines as FIG. 6 except that the steerable axle is not turning and is undergoing an oscillatory pitching motion due to traveling over an obstacle.

FIGS. 6 and 7 depict the relative positions of the various components from behind the axle 15 looking forwardly at the axle 15. In FIG. 6, the straight lateral shifting movement of the axle 15 relative to the chassis 11 to accomplish a right turn is best seen. Because of the limited vertical movement between the chassis 11 and the axle 15 during such lateral shifting movement, the oscillation stop 25 does not come into operation. In FIG. 7, the pitching motion of the axle 15 due to the right steerable wheel 17b passing over an obstacle S on the ground G causes the right roller 26b to be engaged by the arcuate track 24 and limit the pitching motion of the axle 15.

One skilled in the art will readily realize that the arcuate track 24 need not be a continuous member extending from one side of the chassis 11 to the other for engagement with the rollers 26. As an equivalent alternative configuration, the track 24 could be manufactured in segments (not shown), so long as each segment was positioned to be engageable with the corresponding roller 26 throughout the entire range of movement of the chassis-mounted roller 26 relative to the axle 15. The segments (not shown) could be oriented on the axle 15 in a non-contiguous manner. Furthermore, one skilled in the art will readily understand that the rollers 26 could number more than two as described above; however, one roller 26 corresponding to each side of the chassis 11 was found to be most economically desirable and preferred.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a vehicle having a chassis, a transverse axle pivotally supported from said chassis for both an oscillatory pitching movement relative thereto about a generally longitudinally extending axis and a lateral movement about a generally vertical pivot axis positioned rearwardly of said transverse axle, said transverse axle having a pair of steerable wheels pivotally connected to the opposing transverse ends of said axle, and a steering mechanism operably connected to said steerable wheels to control the pivotal movement thereof relative to said axle for controlling the direction of travel of said vehicle, said steering mechanism including means for effecting relative pivotal movement between said axle and said chassis in response to the pivotal movement of said steerable wheels, the improvement comprising:

an oscillation stop means operatively disposed between said transverse axle and said chassis for limiting the amount of oscillatory pitching motion of said axle throughout the entire range of lateral movement of said axle.

2. The vehicle of claim 1 wherein said oscillation stop means includes an arcuate track and a pair of transversely spaced rollers engageable with said arcuate track throughout the entire range of lateral movement of said transverse axle.

3. The vehicle of claim 2 wherein said arcuate track has a center of curvature substantially coincidental with said vertical pivot axis.

4. The vehicle of claim 3 wherein said arcuate track is mounted on said transverse axle, said rollers being mounted on said chassis on opposing sides of said longitudinally extending axis of oscillation.

5. The vehicle of claim 4 wherein said rollers are rotatably supported about respective axes of rotation, each said axis of rotation being aligned with said vertical pivot axis.

6. In a vehicle having a chassis, a transverse axle pivotally supported from said chassis for an oscillatory pitching movement relative thereto about a generally longitudinally extending axis, said transverse axle having a pair of steerable wheels pivotally connected to the opposing transverse ends of said axle, and a steering mechanism operably connected to said steerable wheels to control the pivotal movement thereof relative to said axle for controlling the direction of travel of said vehicle, said steering mechanism including means for effecting relative pivotal movement between said axle and said chassis in response to the pivotal movement of said steerable wheels, the improvement comprising:

a track mounted on said transverse axle; and a pair of rollers mounted on said chassis on opposing sides of said longitudinally extending axis to be engageable with said track after a predetermined amount of oscillatory pitching movement has been undertaken to limit the amount of permissible oscillatory pitching movement of said transverse axle.

7. The vehicle of claim 6 wherein said transverse axle is laterally movable relative to said chassis about a generally vertically extending pivot axis positioned rearwardly of said transverse axle, said track having an arcuate shape and being co-extensive with the range of lateral movement available to said transverse axle such that said rollers are engageable with said arcuate track to limit oscillatory movement of said transverse axle throughout the entire range of relative lateral movement thereof.

8. The vehicle of claim 7 wherein said arcuate track has a center of curvature coinciding with said vertical pivot axis.

9. The vehicle of claim 8 wherein said rollers are rotatably supported about respective axes of rotation, each said axis of rotation being aligned with said vertical pivot axis.

10. A vehicle comprising:

a chassis;

a transversely extending steerable axle pivotally supported from said chassis for lateral movement relative to said chassis about a generally vertically extending pivot axis, said axle being supported for oscillatory pitching movement relative to said chassis about a generally longitudinally extending pivot axis; and an oscillation stop means operatively disposed between said transverse axle and said chassis for limiting the amount of oscillatory pitching motion of said axle throughout the entire range of lateral movement of said axle.

11. The vehicle of claim 10 wherein said oscillation stop means includes an arcuate track and a pair of transversely spaced rollers engageable with said arcuate track throughout the entire range of lateral movement of said transverse axle.

12. The vehicle of claim 11 wherein said arcuate track has a center of curvature substantially coincidental with said vertical pivot axis.

13. The vehicle of claim 12 wherein said arcuate track is mounted on said transverse axle, said rollers being mounted on said chassis on opposing sides of said longitudinally extending axis of oscillation.

14. The vehicle of claim 13 wherein said rollers are rotatably supported about respective axes of rotation, each said axis of rotation being aligned with said vertical pivot axis.

* * * * *